April 8, 1969    N. JOHNSTON    3,437,992

SELF-CONTAINED DOWNHOLE PARAMETER SIGNALLING SYSTEM

Filed Feb. 23, 1967    Sheet 1 of 5

Norris Johnston,
INVENTOR

BY

Bernard Kriegel

ATTORNEY.

April 8, 1969  N. JOHNSTON  3,437,992
SELF-CONTAINED DOWNHOLE PARAMETER SIGNALLING SYSTEM
Filed Feb. 23, 1967  Sheet 5 of 5

Norris Johnston,
INVENTOR
BY.

Bernard Kriegel
ATTORNEY.

United States Patent Office 3,437,992
Patented Apr. 8, 1969

3,437,992
SELF-CONTAINED DOWNHOLE PARAMETER SIGNALLING SYSTEM
Norris Johnston, Ojai, Calif., assignor to Kirk R. Shirley, Long Beach, Calif.
Filed Feb. 23, 1967, Ser. No. 618,182
Int. Cl. G01v 1/40
U.S. Cl. 340—18                                   13 Claims

ABSTRACT OF THE DISCLOSURE

A system for signalling downhole parameters, such as temperature and pressure, from a producing well includes the combination of a mechanically driven electrical power supply, a parameter magnitude-to-time interval converter, and an impulse telemetering circuit for transmitting information to the surface.

The longitudinal vibration of the tubing string, resulting from pumping, drives a linear alternator, including a "tuned" inertial mass, permanent magnet assembly that generates alternating current. A rectifier converts A.C. to D.C. and stores electrical energy in a large heat insensitive capacitor. An electrical timing circuit converts parameters such as temperature and pressure to time intervals marked by signal pulses. A stepdown transformer applies the signal pulse between tubing and casing, and an inductive pick-up at the surface between the tubing and casing steps up the signal pulses to usable levels for recording.

---

This invention relates to well apparatus, and more particularly to apparatus for signalling the pressure, temperature or other physical characteristics of a producing well.

In the operation of wells, especially wells producing hydrocarbons from subsurface reservoirs, it is desirable to obtain as much knowledge as possible about the physical conditions in the well throughout its useful production life. Such knowledge helps to optimize the recovery from the reservoir. Taking into consideration such factors as cost, efficiency and the utility of the pumping equipment, two of the most important physical parameters of any producing well are temperature and pressure within the well. Other physical parameters may also be of interest.

One of the greatest obstacles to the use of electrical signal equipment in a producing well has been the problem of providing an adequate source of electrical power. One approach required supplying electrical power from the surface, either using the well tubing and the casing as conductors, or providing separate, suitably insulated wire conductors from the surface to an in situ device. This approach must overcome the problems of the reliability of the electrical connection from the surface and the possibility of short circuits such as one caused by contact of tubing and casing with each other and with the ground. Separate wires are subjected to extreme abuse and rarely survive the environment over a period of time, especially if repairs are necessary to the well or the instruments.

Another approach utilizes electrical storage batteries in conjunction with electrical instruments. A self-sufficient instrument package is then placed inside the well, the environment of which is quite hostile. Ambient temperatures frequently exceed 100° C., which adversely affects battery life, and frequent replacement of the power supply is usually required.

Another major problem area that exists is the form in which the characteristic parameters should be signalled, and the methods to be used in transmitting information to the surface. Prior art devices have utilized a plurality of oscillator circuits, each generating a characteristic frequency representing a different parameter, and many different approaches have been used for sending this information to the surface. The amplitude of signals has been used to represent a characteristic parameter while the frequency of the signals identified which, of a group of parameters, was being signalled. A relatively high frequency signal, with a lower frequency signal modulated thereon, has been used where the modulating frequency corresponds to and is representative of a particular parameter. A plurality of parameters were signalled, each at a different modulating frequency. The magnitude of the parameter was represented by the magnitude of a change in the modulating frequency from a predetermined modulating frequency. These signalling systems require one or more oscillator circuits and a "radio" type communication link to the surface. Signal recognition and demodulating equipment were required at the surface to interpret and display the signalled information.

It would be desirable, however, to provide a simple signalling system where the mere presence or absence of a signal is sufficient to transmit the desired information. The time between successive signals can be an indication of not only the magnitude of the parameter being measured, but also an indication of which of a plurality of parameters is being signalled.

According to the present invention, a novel system has been devised which because of its simplicity, enables a most effective utilization of the environment in which it is to be used. Parameters, such as temperature, pressure, and the like, are signalled by the generation of an impulse which initiates a timed interval. A second impulse is generated after a time lapse which corresponds to and is representative of the magnitude of the parameter, within predetermined limits.

Each parameter to be measured is assigned a unique span of time. For a first parameter the interval varies between upper and lower limits, one of which represents a minimum value and the other maximum value. A second parameter is signalled by a second pair of impulses, which define a second time interval span that is different than the first parameter span. For example, a first parameter could be represented by a time span ranging from 10–20 seconds where 10 seconds represent a minimum magnitude and 20 seconds a maximum magnitude. A second parameter is represented by a time span ranging from 25–35 seconds where 25 seconds corresponds to a minimum magnitude and 35 seconds is a maximum. A third parameter could then be signalled by a third interval span different from the first and second interval spans. As will be readily appreciated, a plurality of parameters can be signalled, and the time elapsing until the interval terminating pulse is generated uniquely determines not only the magnitude of the parameter, but also which of the parameters is being signalled.

In alternative embodiments, switching circuits are provided so that a pulse signalling the end of an interval for one parameter also signals the beginning of an interval for a different parameter, thus permitting a continuous cycling or scanning of the various parameters. As explained above, the interval between any two successive impulses uniquely identifies both the parameter being signalled and the magnitude of the parameter.

Since the mere presence of an impulse is sufficient to convey information, the apparatus for conveying this information to the surface can be greatly simplified. According to the present invention, a signalling pulse of approximately 30 milliseconds duration is generated and may have a magnitude of 30 volts. The resistive impedance of approximately one mile of oil well tubing and casing is approximately one ohm. Therefore, to conserve power, an output signal of approximately one volt is preferable and is applied between the tubing and the casing.

At the surface, a multi-turn, toroidal pick-up coil is mounted in the well head. The tubing and casing at the surface form a single turn, "primary," which is inductively coupled to the multi-turn "secondary" pick-up coil. Even if the one volt signal is attenuated by several orders of magnitude, a detectable signal is still possible. The secondary coil provides an amplified output through an armored and sealed plug located, for example, in the gas line of a well.

To supply power to the pulse generators according to the present invention, a high temperature, power storage capacitor is used, which is rated for temperatures in excess of 100° C. The capacitor is continuously charged by conversion of the mechanical energy in the pumping system into electrical energy. As is known, a pumping well transfers the weight of the column of oil standing between the surface and the piston from the pump rod string on the upstroke to the well tubing on the downstroke. A substantial mass is abruptly transferred back and forth. As a result, an alternate elongation and contraction of the tubing takes place, which, in a typical well, pumping at the rate of as few as 6 strokes per minute, can be as much as 0.1 inch. Due to the elasticity of the tubing string, a linear vibration is initiated with each weight transfer. If a spring mounted inertial mass is tuned to the frequency of vibration, the mass may be kept in motion with a maximum energy transfer. A plurality of permanent magnets is affixed to the inertial mass, and a plurality of coils within a magnetic return circuit is positioned concentric with the magnets. Even limited relative motion between the magnets and the coils generates a substantial alternating current signal and at useful voltages.

If the generator output is applied to a rectifying bridge and a voltage limiting device, a virtually constant D.C. charging current can be supplied to the capacitor. So long as the capacitor can be maintained at full charge, electrical power can be supplied to the transducer circuits. Viewed differently, the large storage capacitor "integrates" the "rippling" rectified, D.C. voltage output of the "alternator," which is driven by the longitudinal vibrations in the tubing resulting from the pumping action.

In an alternative embodiment, adapted for use in a flowing well (wherein a pump assembly is not required), substantially the same "alternator" apparatus can be utilized if a "flow interruptor" is introduced into the well to create pressure surges resulting in an oscillation of the tubing string.

A switching circuit alternatively energizes the various timing circuits, corresponding to each of the parameters. In a first embodiment, a dual action, latching relay is employed. One set of contacts alternatively couples the pulse output of the first or second parameter transducer to the output circuit. A second contact pair alternatively applies an energizing impulse to the relay coils for changing the switch configuration.

In alternative embodiments, flip-flop type circuits are utilized to provide the power source alternatively to the two transducers. The resultant output signals would be used to trigger the flip-flop. In yet other embodiments, involving more than two transducers, either relay circuits or their solid state electronic equivalents, such as ring counters, could be utilized to provide the desired sequential operation.

Where the environment permits, a rechargeable storage battery could also be used as a power supply if deemed preferable to the storage capacitor.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings.

Figure 1:
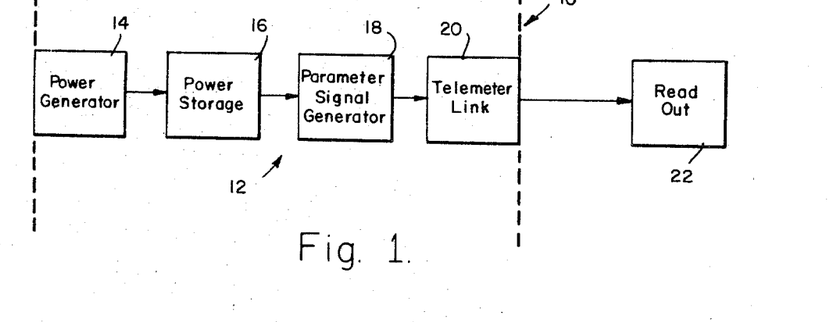
FIGURE 1 is a block diagram of a system of the present invention.

Turning first to FIG. 1, the interior of a producing well 10 is indicated generally by parallel dashed lines. Within the well 10 are the elements comprising the signalling system 12 according to the present invention. A power generator 14 is physically coupled to the tubing (not shown) of the well 10 and is responsive to longitudinal vibrations of the tubing to generate an electrical current which is applied to a power storage element 16.

The power storage element 16 accumulates electrical energy and serves as the power source for the electrical circuits of a parameter signal generator 18, which produces unique signal outputs which correspond to and are representative of the physical conditions within the well 10. These signals are applied to a telemeter link 20 which includes the well tubing (not shown) and well casing (not shown). The signals can then be applied to a read-out device 22, which is external to the well 10 and is located at the surface. The read-out device 22 may be a recorder, which is adapted to connect to a plurality of wells, and need not be permanently connected to a single well.

Figure 2:
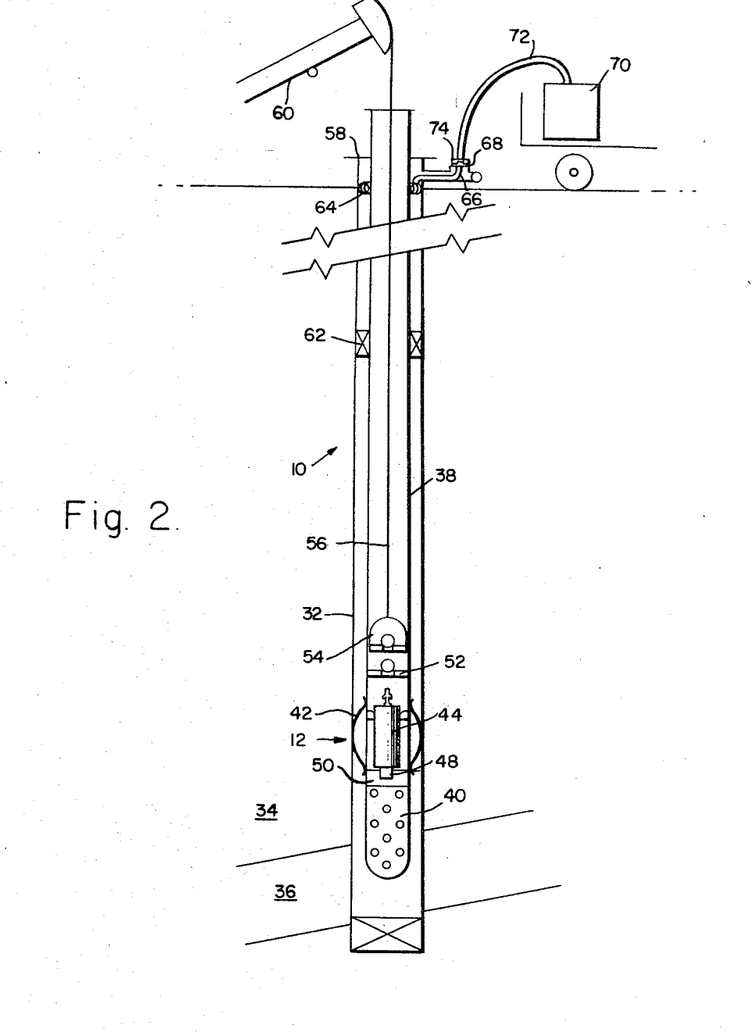
FIG. 2 is an idealized view of a pumping well with a signalling system according to the present invention installed therein.

In FIG. 2, there is shown a typical pumping well having a signalling system 12, according to the present invention, installed therein. As shown, the well 10 includes an outer casing 32, which extends through the earth formations 34 from the top of the well bore into a producing region 36. Located with the casing 32 and substantially concentric therewith is a tubing string 38 which terminates at its lower end in a perforated gas anchor 40 through which fluids flow.

Centering guides 42 are provided to center the tubing 38 within the casing 32. An instrument package 44, which includes the system 12 of FIG. 1, is adapted to fit within a special sub within the tubing string 38. The instrument package 44 is provided with a collet assembly 48 which fits into an appropriate seating assembly 50, both of which are shown in greater detail in FIG. 3B. Suitable electrical connections are provided for coupling the instrument package 44 to the tubing 38 and through the centering guides 42 to the outer casing 32, also shown in greater detail in FIGS. 3A, 3B.

Electrically, the tubing 38 and the casing 32 appear as a "coaxial conductor" which is "shorted" at the surface. The pumping assembly, which is located in the tubing 38 above the instrument package 44, includes a standing valve 52 and a piston or travelling valve 54. The piston 54 is connected by a pump or sucker rod string 56, extending through a conventional well head connection 58, to a walking beam 60.

An insulated anchor 62 is installed in the well between the tubing 38 and the casing 32, which provides an electrically isolated mechanical coupling between the outer well casing 32 and the tubing string 38. The anchor 62 is placed at a predetermined distance above the instrument package 44. The anchor tends to limit longitudinal oscillation in the tubing to the surface and thereby reduces frictional wear on the tubing couplings, which, in turn, keeps the contact resistance high between tubing and casing. The location of the anchor 62 is one of the factors that determines the frequency of longitudinal oscillation of the tubing 38 as a result of the pumping action.

For example, in a 2,000 ft. well producing 26° A.P.I. oil, with a tubing anchor located approximately 160 ft. above the pump shoe and the gas anchor extending approximately 40 ft. below the shoe, 2½″-#6 tubing would normally "breathe," that is, expand and contract, approximately 0.1 inch every half stroke and would oscillate at approximately 20 cycles per second. Since the pump of a producing well normally operates somewhat faster than 6 strokes per minute, a 0.1 inch motion would be initiated at least once every five seconds, resulting from a weight change of approximately 3,500 lbs. The weight of the oil column is carried by the rod string 56 during its upstroke, while the tubing string 38 supports the weight on its downstroke. The oscillation of the tubing at the 20 cycle rate is damped by the friction and the viscosity of the oil.

The electrical output of the instrument package 44 is applied, as described above, between the casing 32 and the tubing 38. At the well head 58, an electrical connection is completed between the tubing 38 and the casing 32. A multi-turn, toroidal coil 64 is placed in the space between the casing 32 and the tubing 38. The toroidal coil 64, which includes a plurality of turns for voltage amplification, is the "secondary" of a "transformer," the "primary" of which is the "single turn," consisting of the serially connected tubing 38 and casing 32.

An armored cable 66 extends through the well head 58 and terminates in a sealed plug 68. A recorder and display device 70 is provided with a cable 72 having a mating plug 74 which is adapted to fit the sealed plug 68.

In operation, the reciprocating pumping action sets up longitudinal oscillations in the portion of the tubing string 38 between the insulating anchor 62 and the gas anchor 40. Despite then damping caused by internal friction in the tubing and the viscous drag of the oil in the annular space, an oscillation at a 20 cycles per second rate is initiated with each pump stroke, with an initial amplitude of as much as 0.3 inch, which attenuates with time. Any pumping well in which the present invention is of interest will operate at a rate of no less than six strokes per minute. Accordingly, the oscillations are reinforced roughly every five seconds, or less, if the pump operates at a faster rate.

Figure 3A:
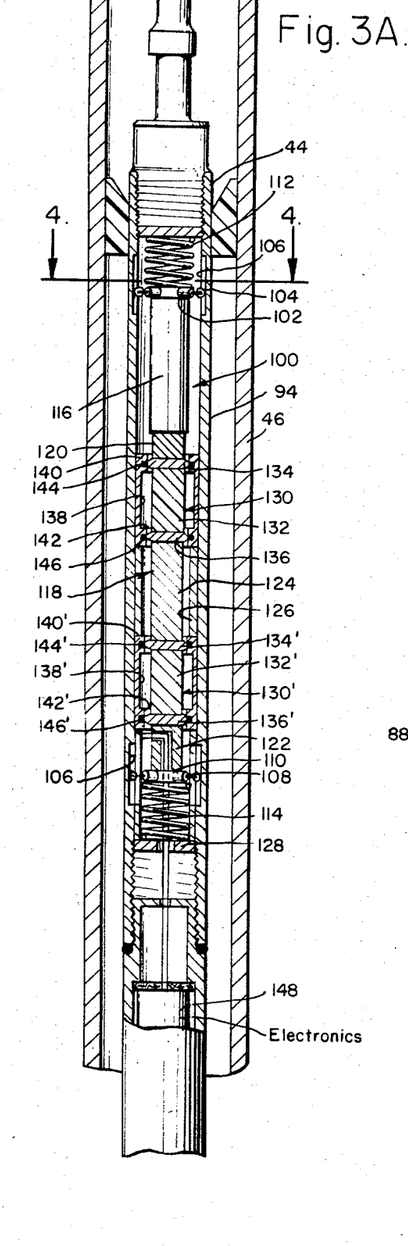
FIGS. 3A and 3B together comprise a longitudinal section through a preferred embodiment of a signalling assembly, showing the alternator in detail.
Figure 3B:
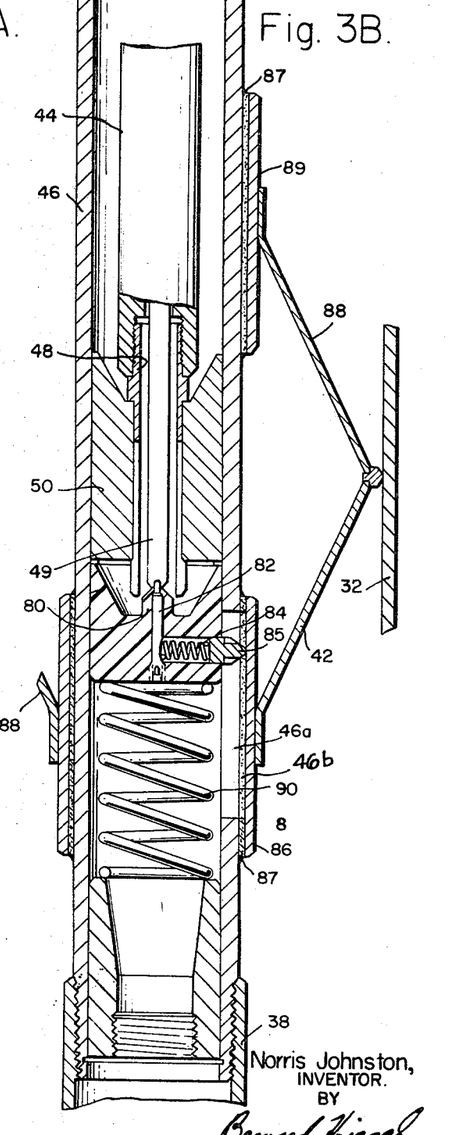

The electrical power generator or "alternator" of the present invention is shown in greater detail in FIGS. 3A and 3B. A special sub 46 is shown in which the entire instrument package 44 is releasably engaged to enable retrieval and replacement. The sub is adapted to be connected in the tubing string above the gas anchor 40. FIGS. 3A and 3B are intended to be aligned vertically, with the top of FIG. 3B being connected to the bottom of FIG. 3A.

As shown in FIGS. 3A and 3B, the sub 46 is in the tubing string 38 and carries the removable instrument package 44, which is hermetically sealed to protect its contents. The instrument package 44 is fastened in place by a conventional collet 48 which fits a conventional seating assembly or spider 50 suitably secured to the sub 46. A central rod 49 mates with a central connecting pin 82 disposed in an insulating spider 80, the pin 82 being connected through a connecting spring 84 to a pin 85, which extends through a slot 46a in the sub 46 and a slot 46b in an insulation sleeve 87 to contact the lower ring 86 of the centering guide 42. A plurality of leaf spring members 88 are attached to the lower ring 86 and are adapted to electrically connect the instrument package to the casing 32 by contacting the latter. The lower ring 86 is fixedly mounted on the sub 46.

The upper end of the centering guide 42 includes an insulating collar 89 adapted to slide axially on the sub 46, the upper ends of the leaf spring members 88 being secured to the collar 89.

A spring member 90 urges the spider connector 80 upwardly and the pin 82 in contact with the rod 49. The spring 90 is sufficiently stiff with respect to the instrument package 44 so that longitudinal oscillations of the sub 46 are transmitted directly to the instrument package 44, the collets 48 and the seating assembly 50. The spring 90 is primarily intended to soften the shock of seating a replacement instrument package 44 in the assembly 50.

The primary source of electrical energy, according to the present invention, is an oscillating inertial mass which may be "tuned" to the vibrating frequency of the tubing 38 during the normal pumping operation. In one arrangement, the frequency was empirically determined to be approximately 20 cycles per second. As shown in FIG. 3A, a linear, permanent magnet "alternator" system has been devised, which includes a spring mounted inertial mass system which includes a plurality of permanent magnets. The spring mounted mass system is adapted to be movable with respect to a plurality of concentric and coaxial coils that are mounted in a concentric, permeable magnet "stator" system. As the permanent magnets "oscillate" with respect to the "stator" magnets, an alternating electrical current is induced in the coils carried by the stator magnets and is applied to the electrical circuits which are described in greater detail in connection with FIGS. 4, 5 and 6 below.

A retriever head 92 is provided at the top of the instrument package 44, so that the instrument package 44 may be fished out of the well with a wire line socket (not shown), to enable a replacing of the instrument package 44 without the need for pulling the tubing string 38. A replacement package can then be lowered into place and the collet of the replacement package will snap and lock into the seating assembly 50, and the central rod 49 will engage the cup 80 and pin 82.

A sealed instrument case 94 contains an alternator assembly 100, which is adapted to be sensitive to axial, longitudinal oscillations of the tubing string 38. To prevent "binding" of the movable elements within the case 94, a pair of centering devices are provided at the upper and lower ends of the assembly. The upper centering device 102 includes three radially adjustable rollers 104 which ride in appropriate grooves 106 in the inner wall of the case 94. The grooves 106 may be coated with a dry lubricant, such as molybdenum disulphide, to reduce friction. Other devices are available to support the alternator assembly 100 and to minimize axial drag. An upper oscillating spring 112 and a lower oscillating spring 114 support an inertial mass 116 and an alternator portion 118 that oscillates therewith. A lower centering device 108 is provided with a central opening 110 to permit the electrical leads from the "stator" assembly to be carried substantially along the axis into an electronics package which is positioned below the alternator assembly 100.

As shown, a pair of alternator assemblies are utilized, the elements of which are distinguished by the use of primed reference numerals, and which are separated from each other and from the inertial mass 116 by non-magnetic upper, lower and central brass spacer segments 120, 122, 124, which are axially aligned therewithin. Similarly, upper and lower brass spacer collars 126, 128 are provided to support the "stator" assembly within the instrument case 94.

The spring supported alternator portion 118 includes, in a preferred embodiment, a pair of spool-shaped magnetic elements 130, 130$^1$, which have cylindrical central portions 132, 132$^1$ of a permanent magnet material, such as Alnico V, which are polarized in the axial direction.

Upper and lower pole pieces 134, 136, 134¹, 136¹ made of a highly permeable material, such as Permalloy, are fastened to the ends of the central portions 132, 132¹.

A pair of concentric and coaxial "stator" segments 138, 138¹ are fitted in the case 94 and provide a magnetic return circuit for the magnetic elements 132, 132¹, respectively. The "stator" elements 138, 138¹ are also made of a highly permeable material, such as Permalloy, and are dimensioned to closely match the magnetic elements 130, 130¹. In the vicinity of the pole pieces, the stator segments 138, 138¹ are fitted with circumferential upper and lower coil slots 140, 142, 140¹, 142¹. Circumferential coils 144, 146, 144¹, 146¹ are fitted in the slots 140, 142, 140¹, 142¹ and are serially interconnected. Each of the pole pieces is carefully shaped to match the gap of the adjacent coil slot. The pole pieces are closely fitted to the stator segments with minimal clearance. In one embodiment, each of the circumferential coils made up of 6,000 turns of No. 40 magnet wire.

Any axial component of a force applied to the case 94 results in relative motion between the magnetic elements 130, 130¹ and the stator segments 138, 138¹. Such relative motion induces an alternating electrical current within the circumferential coils 144, 146, 144¹, 146¹ of a magnitude and frequency, that is a function of amplitude, rate and relative velocity of the relative motion, as between the magnetic elements and stator segments, In the preferred embodiment, twenty longitudinal oscillations per second, of an average amplitude of 0.1, generated a potential difference of approximately 115 volts at maximum displacement and approximately 60 volts at minimum displacement. It may be assumed that initially, the permanent magnet alternator 118 and inertial mass 116, supported as they are by the upper and lower springs 112, 114, are at "rest" in inertial space. However, the "stator" system, which is attached to the case 94 and to the tubing 38, is thrown into oscillatory motion. The term "stator" is, therefore, somewhat of a misnomer, but is used to refer to that portion of the alternator including the coils. Relative motion between the mass and the stator will exist. In time, some of the motion is transferred to the inertial mass and alternator 116, 118, and if the mass system is "tuned" to the vibration frequency, maximum relative displacement will periodically recur.

In alternative embodiments of the present invention, an oscillating system can be provided which is substantially independent of the vibrational frequency of the tubing, but which is periodically thrown into oscillation by the "shock" produced by the alternating "up" and "down" strokes of the pump, and the consequent shifts of weight from the pump rod to the tubing string. These "shocks" occur roughly at five second intervals, or less, and are of sufficient force to maintain the vibrating system in oscillation, with an amplitude adequate to assure the continuous generation of alternating current electricity.

A block 148, generally designated Electronics, is described in greater detail in connection with FIGS. 5 and 6 below. Indicated, in schematic fashion, is the connection to the block 148 of the conductors which lead to the coils 144, 144¹, 146, 146¹ and which apply the generated alternating electrical current to the electronic portion of the system.

Figures 4, 9:
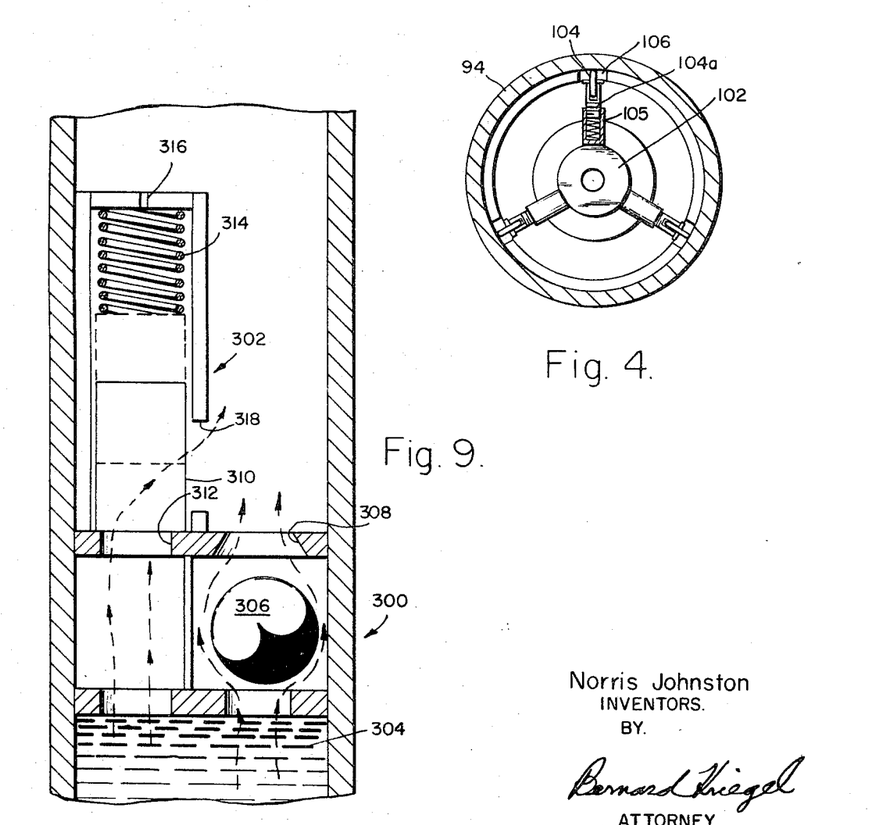
FIG. 4 is a top view of a centering device taken along line 4—4 of FIG. 3A in the direction of the appended arrows.
FIG. 9 is an idealized sectional view of a flow interruptor assembly to enable the use of the system of the present invention in flowing wells.

In FIG. 4, there is shown in greater detail the upper centering device 102, which is considered exemplary only. As shown, three arms 104a, each terminating in a roller 104, extend from the centering device 102. Three grooves 106 are provided in the inner wall of the case 94, in which the rollers 104 ride. An adjustment can be provided for each of the arms, as by threading the arms into a collar member 105. By individually adjusting the arms 104a, the linear alternator can be accurately centered within the stator segments to maximize the efficiency of the linear alternator.

Figure 5:
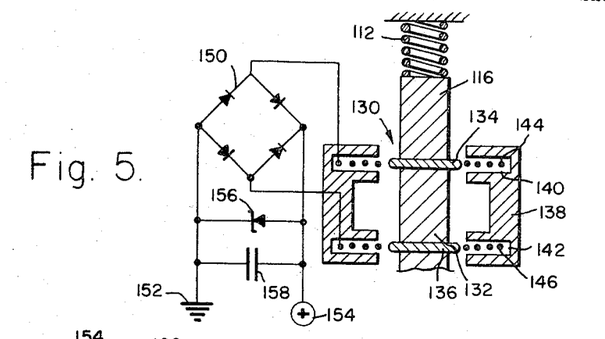
FIG. 5 is an idealized schematic diagram of the power supply portions of the signalling system of FIG. 1.

FIG. 5 is an idealized representation of the power generator and power storage portion of the system. The alternating current generator of FIGS. 3A, 3B is represented in generalized fashion. The magnetic element 130 and pole pieces 134, 136 move relative to the coils 144, 146, cutting lines of magnetic flux and inducing an alternating electrical current in the coils 144, 146. This alternating electrical current is applied to the opposite input ends of a bridge rectifier 150.

The output of the bridge rectifier 150 is connected between a source of common reference potential, indicated by the conventional ground symbol 152, and a relatively positive terminal, indicated by a plus symbol 154. A voltage limiting, breakdown or Zener diode 156 is applied across the output of the bridge 150 to limit the voltage difference to a predetermined value. In the preferred embodiment, a maximum voltage difference of approximately 32 volts is permitted between the relatively positive terminal 154 and the common reference potential 152.

A heavy duty capacitor 158 serves as both a filter and a power source. The capacitor 158 is of a size and power capability sufficient to store electrical energy over the temperature range which might be encountered in the downhole environment. In the preferred embodiment, a capacitor rated at 12,500 microfarads at 50 volts, operable at temperatures in excess of 250° F., and which can retain an electrical charge of 0.375 coulombs at 30 volts, was used. So long as relative motion exists between the inertial mass 116 and the case 94, pulses of relatively positive potential are applied to the capacitor 158, charging it and maintaining it at its full charge.

Figure 6:
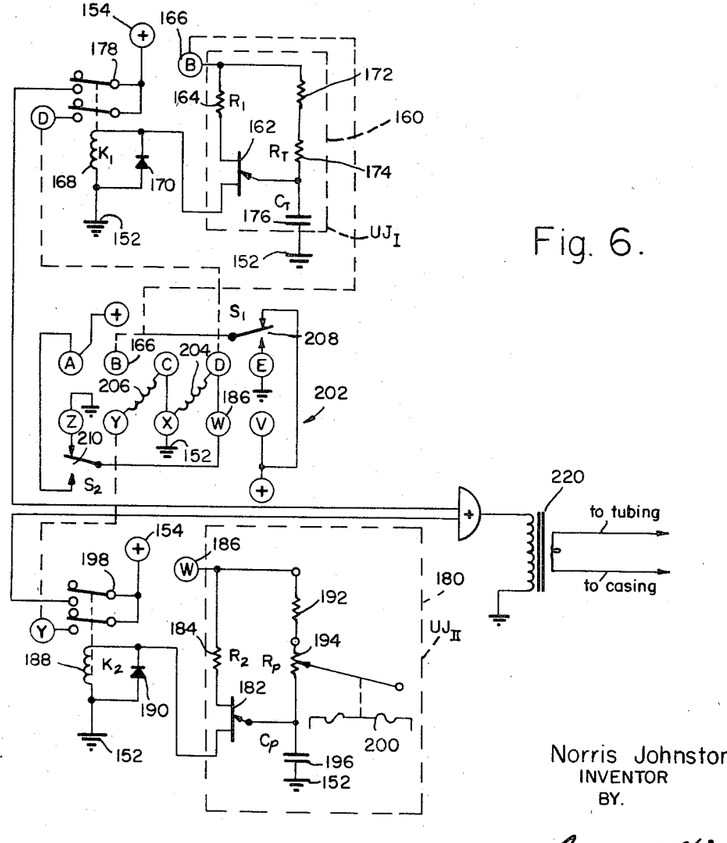
FIG. 6 is an idealized schematic diagram of a preferred embodiment of the parameter signal generator of FIG. 1.

Turning next to FIG. 6, there is shown a schematic diagram of a preferred, electromechanical embodiment of a switching system which, in combination with typical transducer circuits, is operable to provide a unique indication of, for example, two well parameters, such as temperature and pressure. The transducers can be sutably located to sense the parameters and are schematically shown to be in the electrical circuit. Typical unijunction transistor oscillator circuits are shown at page 143 of the General Electric Transistor Manual, Fifth Edition, published in 1960 by the General Electric Company. The time delay relay circuit, such as illustrated in FIG. 13.14 of that publication is readily adaptable to the present invention.

A first time delay circuit $UJ_I 160$ includes a unijunction transistor 162. Connected to one of the bases is a current limiting resistor $R_1 164$, which is adapted to connect to a source of potential. As shown, a terminal identified by 166B is provided. One terminal of a $K_1$ relay winding 168, whose other terminal is connected to the common reference source 152, is connected to the other base. A diode 170 is connected in parallel with the relay winding 168 to prevent inductive transients.

The firing circuit of the unijunction transistor 162 includes a calibrating resistor 172 in series with a temperature responsive element $R_T 174$, which may be a thermistor, or any other device which changes resistance with changes in temperature. A timing capacitor $C_T 176$ connects the emitter to the common reference 152. A pair of normally open switches 178 are controlled by the $K_1$ relay 168, the blades of which are connected in parallel to the positive source 154.

Similarly, a second time delay relay circuit $UJ_{II} 180$ is provided which is responsive to pressure. One base of a second unijunction transistor 182 is connected through a current limiting resistor $R_2 184$ to terminal W186. The other base is connected to one terminal of a $K_2$ relay winding 188, the other end of which is connected to the common reference 152. As above, a diode 190 is connected in parallel with the relay winding 188 to protect the transistor.

The triggering network for the second unijunction transistor 182 also includes a calibrating resistor 192 and a variable resistor $R_p 194$ in series therewith connected to the emitter. A capacitor $C_p 196$ connects the emitter to the common reference source 152. A second pair of normally open switches 198 connect to the source of positive potential 154, and are controlled by the $K_2$ relay. The value of the resistor $R_p 194$, as shown, is controlled by a diaphragm 200 which is responsive to ambient pressure. The resistive impedance of the resistor $R_p 194$ is, therefore, a function of pressure.

In the illustrated embodiment, a dual action, latching relay 202 is utilized for switching, as between the first and second unijunction oscillator circuits, $UJ_I 160$ and $UJ_{II} 180$. For ease in description, the ten terminals of the relay 202 have been given alphabetic designations. As shown, terminals C and X are commonly connected to the common reference 152. A first relay winding 204 is connected between terminals D and X and a second relay winding 206 is connected between terminals C and Y.

The dual action, latching relay 202 is arranged so that the first and second windings 204, 206 have opposite effect with respect to a pair of switches $S_1$ and $S_2$, 208, 210. The movable element or "swinger" of switch $S_1 208$ is coupled to terminal B, while the "swinger" of switch $S_2 210$ is coupled to terminal W. The two contacts, which the swinger of the $S_1$ switch 208 alternately engage, are E and V. Similarly, terminals A and Z are alternately contacted by the swinger of switch $S_2 210$.

In one configuration, switch $S_1$ contacts V and $S_2$ contacts Z. Alternatively, $S_1$ contacts E and $S_2$ contacts A. In the interconnection shown, the terminal D is coupled to the normally open contact switch of relay $K_1 168$, and terminal Y is connected to the normally open contact of switch of relay $K_2 198$. The power source positive terminal 154 is then connected to terminals V and A, while the common reference 152 is also connected to Z and E.

In operation, assuming the relay 202 is in the configuration shown in FIG. 6, $UJ_I 160$ is connected to a source of positive potential 154 through terminal B, switch $S_1$, and terminal V. At the same time, the $UJ_{II}$ circuit 180 is coupled to ground 152 through terminal W, which is connected through switch $S_2 210$ to terminal Z. $C_T 176$ begins to charge, and, after an interval determined by the time constant of the charging circuit, the unijunction transistor 162 fires to energize coil $K_1 168$. A positive potential is now applied to terminal D of the dual action relay and also to an element of the telemeter link.

The telemeter link, in the preferred embodiment, is a step-down transformer 220, which includes a plurality of turns in the primary and a single turn in the secondary, for reducing the potential of applied impulses to approximately 1 volt. Empirical tests have determined that the resistive impedance of one mile of casing and tubing is approximately 1 ohm. A 1.0 volt signal limits the power of pulses to approximately 1 watt, and prevents an undue power drain from the storage circuits.

The application of the positive potential to terminal D energizes the first winding 204 which throws the switches $S_1$ and $S_2$ to their opposite states, thereby connecting terminal B to terminal E and terminal W to terminal A. This has the effect of completely discharging the timing capacitor $C_T 176$ in $UJ_I 160$ and deenergizing relay coil $K_1 168$. Switch 178 returns to its normal configuration, decoupling the transformer 220 primary and contact D from the source of potential.

The connection of terminal A to terminal W through switch $S_2 210$ applies positive potential to $UJ_{II} 180$. After an appropriate time interval, the second unijunction transistor 182 applies an energizing current to the coil of the $K_2$ relay 188, thereby closing its associated switch 198 and applying a power impulse to the input of power transformer 220, and to the second relay winding 206 at terminal Y, which throws the switches $S_1$ and $S_2$ into their respectively opposite states. A ground connection is made to terminal W and the relay coil $K_2 188$ is deenergized, releasing switch 198, and the $UJ_I 160$ circuit again charges.

Figure 7:
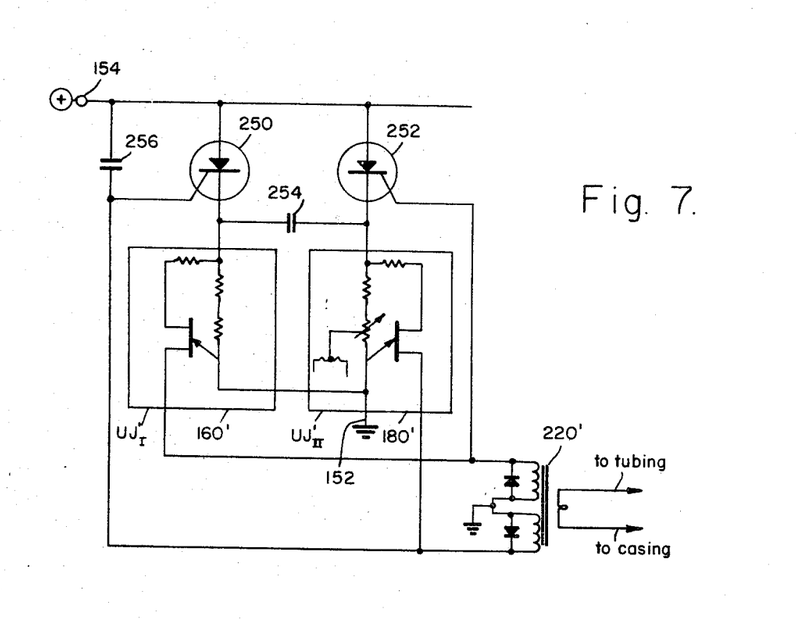
FIG. 7 is an idealized schematic diagram of an alternative embodiment of the parameter signal generator of FIG. 1.

In FIG. 7, there is shown an alternative, all electronic circuit, which can accomplish the purposes of the circuits of FIG. 6. As shown in FIG. 7, the dual action latching relay 202 of FIG. 6 is replaced by a pair of SCR's or Silicon Controlled Rectifiers 250, 252, which are interconnected in parallel between the positive voltage source 154 and the common reference 152. A cross-coupling capacitor 254 is connected between the cathodes. A modified unijunction time delay circuit $UJ^1_I 160^1$ is connected to the cathode of the first SCR 250. Similarly, the cathode of the second SCR 252 is connected to the input terminal of a second modified unijunction time delay circuit $UJ^1_{II} 180^1$.

In the modified time delay circuits $160^1$, $180^1$, the second base of each of the unijunction transistors is connected to a multi-turn primary of a suitably modified signal transformer $220^1$. Rather than to a relay winding, the gate of the first SCR 250 is connected to receive the output of the second time delay circuit $UJ^1_{II} 180^1$, and the gate of the second SCR 252 is connected to receive the output of the first time delay circuit $UJ^1_I 160^1$.

To assure that one of the SCR's is conducting at all times, a triggering capacitor 256 couples the gate of the first SCR 250 to the source of relatively positive potential 154. Initially, the first SCR 250 will be rendered conducting.

The circuit of FIG. 7 will operate substantially identically to that of FIG. 6. When the first SCR 250 is conducting, the first time delay circuit $UJ^1_I 160^1$ will be energized. At the firing of the first unijunction transistor $162^1$, an impulse will be applied to the primary winding of the signal transformer $220^1$. At the same time, a triggering impulse is applied to the gate of the second SCR 252. The cross-coupling capacitor 254 raises the potential of the cathode of the first SCR 250 to cut off. Similarly, when the second time delay circuit $UJ^1_{II} 180^1$ fires, an impulse is applied to the signal transformer $220^1$ and to the gate of the first SCR 250 to initiate conduction. The cross-coupling capacitor 254 drives the cathode of the second SCR 252 to cut-off.

Figure 8:
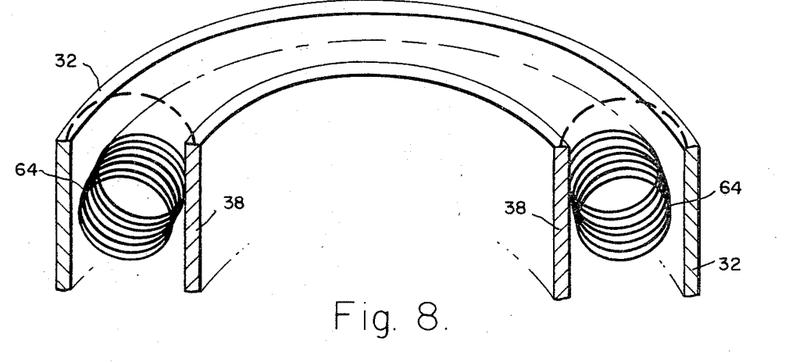
FIG. 8 is an idealized perspective view of the toroidal coil secondary of FIG. 2.

In FIG. 8, there is shown in somewhat greater detail the inductive coil 64, which is the surface or "receiver" element of the telemeter link, which applies the output of the downhole system to suitable recording apparatus. While FIG. 8 is somewhat idealized, it will be recognized that the casing 32 is a cylinder that is coaxial and concentric with the substantially cylindrical tubing string 38. In the annular space between the cylinders, there is placed the "secondary" coil 64. A plurality of coils are arranged in a torus such that the locus of the centers is a circle that is concentric and coaxial with the casing 32 and the tubing string 38.

A series electrical connection is made between the casing 32 and the tubing string 38 at the surface so that electricity tends to flow in a direction to envelop the coil 64. The serially connected casing 32 and tubing string 38, "single turn," is inductively coupled to the coil 64 and any electrical impulse conducted through the tubing string 38 and casing 32 induces an amplified impulse in the toroidal coil 64, which can be applied to a suitable recording instrument, which may be in the field or which may be connected to a central office.

Efficiency of the inductive coupling may be improved by providing a "soft" permeable core to the coil 64. The amplification is, of course, dependent on the relative number of turns and upon the mutual inductance.

In FIG. 9, there is shown a valve arrangement, which, when installed in a flowing well, provides the intermittent action necessary to maintain the alternator system of FIGS. 3A, 3B in operation. As shown, the valve includes a caged ball valve device 300 and a floating piston bypass assembly 302. Flowing oil 304 applies an upward force on a ball 306, seating the ball 306 against an upper orifice 308 to cut off the oil flow. The piston bypass assembly 302 includes a piston member 310 which is held against a second orifice 312 by a spring member 314. An orifice 316 limits the velocity of the piston 310 in the upward direction. When the piston 310 has moved upward sufficiently, an outlet 318 permits flow of oil toward the surface.

In operation, oil flow forces the ball 306 upward and seats the ball 306 against the upper orifice 308. Oil flow is then blocked and the pressure mounts. As the pressure increases, the piston 310 is forced upward against the bias spring 314. The movement of the piston 310 is limited by the flow through the restriction 316. As the piston 310 moves beyond the outlet 318, flow is established through outlet 318 and the pressure holding the ball 306 in the seat 308 is relieved. The ball 306 then falls under gravity to an equilibrium point where it is supported by the oil flow. With the main flow reestablished, the piston 310 is driven by the bias spring 314 to block the outlet 318.

Each time the ball 306 seats, the flow is momentarily interrupted until the piston 310 clears the outlet 318. The intermittent operation, produced by the valve assembly, produces an effect on the tubing string 38 similar to that produced by the pump. Periodically, the tubing will be abruptly compressed by the upward force of the oil flow, and periodically, this force will be released, thereby inducing longitudinal vibration in the tubing string.

Generally, the continuing operation of the alternator and transducer circuits is substantially independent of whether the well is a pumping well or a flowing well with an interrupter installed therein. Interruptions in the flow result in longitudinal oscillation of the tubing string, which, in turn, results in an oscillatory vibration, the frequency of which is determined by the elasticity of the tubing, the length of tubing in vibration, and the various damping factors. However, with each series of oscillations, the longitudinal motion is transferred to the tuned alternator assembly which maintains the storage capacitor at substantially full charge.

With each sudden shift of weight to and from the tubing string, the tubing expands and contracts at a characteristic frequency. In the preferred embodiment of the linear alternator, the instrument casing holding the coil is thrown into longitudinal vibrations, and the inertial mass and permanent magnet remain fixed in inertial space, resulting in relative motion between the permanent magnet and the encircling coils. The alternating current electricity thus generated is rectified in a diode bridge rectifier and is applied to charge a heavy duty, high temperature capacitor, which serves as the power supply for the parameter signalling circuits.

The charge on the capacitor is maintained at a predetermined voltage which is applied to a switching element. In one state, the switching element applies the voltage across a first timing circuit, the time constant of which is controlled by a transducer that is responsive to one of the parameters being measured, such as temperature. When the first timing circuit reaches an appropriate voltage, a unijunction transistor is thrown into conduction and a switching impulse is applied to the switching element. An output signal impulse is developed and the first timing circuit is decoupled from the source of potential.

In the other switching element state, the voltage is applied across a second timing circuit which includes a charging circuit having a time constant which is controlled by a transducer responsive to a second parameter, such as pressure. When the second timing circuit reaches a predetermined voltage, a second unijunction transistor conducts and an impulse is applied to the switching means, disconnecting the second circuit and reconnecting the first circuit. At the same time, a second output signal impulse is generated. The process continues, and the timing circuits are alternately energized.

The output signal impulses are applied to a multi-turn primary winding of a transformer, the secondary of which includes a single turn for converting the output signal impulse from the voltage of the capacitor, to a voltage more compatible with the transmission characteristic of the conductive tubing and casing of the well. This has experimentally been determined to be one volt, if the tubing and casing has a resistance of one ohm. The low voltage signal impulses are then amplified at the surface to acceptable levels, which may be utilized to drive a recorder. So long as the capacitor is charged, the parameter signalling circuits are alternately applying electrical impulses between the tubing string and casing. The intervals between successive impulses identify the parameter being measured and indicate the magnitude of the parameter. At the option of the user, the signals may be continuously monitored, as in a central office, or may be periodically monitored by the utilization of appropriate portable equipment which is adapted to connect to the secondary coil at the top of the well.

In a conventional installation, a portable recording unit may be carried to each of the wells and a connection made to the secondary coil of the telemeter link. The operator can identify the well, the date and time of the recording, and may record several impulses over two or three minute time interval. The record thus made will indicate time intervals of a first duration, and intervals of a second duration which are greater than the first duration. Assuming that the shorter interval signals temperature and that the longer interval signals pressure, the pressure and temperature values are easily distinguished, and the exact duration of the time interval, as between successive pulses, is directly convertible into pressure and temperature magnitudes.

Thus, there has been shown and described a system for signalling downhole conditions in a producing well. Because of the relative inaccessibility of the producing zone and the hostility of the environment to conventional signalling equipment, a replaceable unit has been provided which includes a self-contained electrical power generator and storage system, a parameter signalling system which utilizes the time interval between successive pulses to represent parameters and their magnitude, and which utilizes the tubing and casing as a signal conductor for "wireless" transmission of the signal pulses to the surface.

It is clear that the structure shown and described could be modified in keeping with the teachings of the present invention, as, for example, interchanging the locations of the magnetic elements and stator segments. The permanent magnet can be fitted to the inner wall of the instrument case and the "stator" coils could be mounted centrally with the inertial mass. In this embodiment, the analogy to the "rotor," "stator" terminology of the conventional rotational alternator would be closer and the permanent magnet element would move with tubing oscillations, while the coil could be at "rest" in inertial space.

I claim:
1. In a producing well having electrically conductive tubing and casing therein, apparatus for signalling a physical parameter from a downhole location comprising:
   (a) transducer means adapted to convert the magnitude of a selected parameter into an electrical impulse corresponding thereto;
   (b) step-down transformer means connecting said transducer means between the tubing and casing for reducing the voltage of the electrical impulses generated by said transducer means and for applying such reduced voltage impulses between the tubing and casing; and
   (c) step-up transformer means including a toroidal core positioned near the surface in the annular space between tubing and casing for amplifying reduced voltage signal impulses applied between tubing and casing to useful higher voltage levels,
   whereby the magnitude of the downhole physical parameter is converted to an electrical signal by said transducer means which is transmitted to the surface, utilizing the tubing and casing as a transmission path.

2. In a producing well containing a tubing string and equipment for producing intermittent flow of production in the tubing string, the combination therewith of apparatus for generating electrical energy remote from the surface comprising a linear alternator fixedly mounted to the tubing string and adapted to move therewith, said alternator including:
  (a) an alternator housing having a longitudinal axis substantially parallel with the tubing string axis and fixedly mounted to the tubing string;
  (b) an inductive coil mounted to be coaxial with said alternator housing; and
  (c) a permanent magnet element mounted within said housing concentric and coaxial with said coil, said coil and magnet being movable relative to each other along a longitudinal axis for converting oscillatory linear motion imparted by the tubing string to said alternator housing into relative axial motion between said permanent magnet element and said coil, whereby longitudinal oscillations of the tubing string induced by intermittent flow action impart linear reciprocating motion to said alternator for converting mechanical energy into alternating current electrical energy.

3. The combination of claim 2, wherein the relatively movable one of the permanent magnet element and coil is tuned to have a frequency of resonant vibration comparable to the oscillating frequency of the tubing string.

4. The combination of claim 2, wherein said permanent magnet element includes a first anular pole piece, a second anular pole piece axially displaced therefrom and a permanent magnet member between said pole pieces, and said inductive coil includes a first inductive coil portion adapted to be adjacent to and concentric with said first pole piece and a second coil portion adjacent to and concentric with said second pole piece, and further includes magnetic return path means, concentric and coaxial with said permanent magnet member, said return path means including slots adapted to carry said inductive coil portions.

5. The combination of claim 4, wherein said permanent magnet element is elastically coupled to said alternator housing through resilient support members and said magnetic return path means are fixed to the inner walls of said housing, said permanent magnet element being positioned within said coil portions.

6. The combination of claim 4, wherein said permanent magnet element is fixedly mounted to the inner walls of said housing and said magnetic return path means are positioned within said pole pieces and are elastically coupled to said housing through resilient support members.

7. In a producing well having an electrically conductive tubing string and well casing, the combination with the tubing string and well casing of apparatus for generating and storing electrical energy comprising:
  (a) power generator means including a linear alternator adapted to be energized by longitudinal oscillatory vibration of the tubing string caused by sudden transfers of mass to and from the tubing string;
  (b) rectifying means connected to said linear alternator for converting alteranitng current electricity to direct current electricity;
  (c) voltage limiting means connected to said rectifying means for holding the potential excursions of direct current electricity to a predetermined maximum value; and
  (d) power storage means including filter capacitor means connected to said rectifying means for storing electrical energy produced by said power generator means at the predetermined maximum potential value and for supplying direct current electrical energy to other electrical circuits.

8. The apparatus of claim 7, wherein said rectifying means include a diode bridge rectifier.

9. The apparatus of claim 7, wherein said voltage limiting means include a breakdown diode selected to break down and conduct at all voltage values in excess of the predetermined maximum value.

10. In a producing well having electrically conductive tubing and casing therein, apparatus for signalling a physical parameter from a downhole location comprising:
  (a) transducer means adapted to convert the magnitude of a selected parameter into an electrical impedance corresponding thereto;
  (b) oscillator circuit means having a charging circuit including said transducer means for charging to a predetermined potential in a time interval whose duration is a function of the electrical impedance of said transducer means and for generating a signal pulse when the predetermined potential is reached;
  (c) step-down transformer means connecting said oscillator circuit means between the tubing and casing for applying low voltage signal pulses thereto; and
  (d) step-up transformer means including a toriodal core positioned near the surface in the annular space between tubing and casing for amplifying low voltage signal impulses applied between tubing and casing to useful higher voltage levels,
whereby the time interval between successive signal impulses corresponds to and represents the magnitude of the downhole physical parameter converted by said transducer means.

11. The apparatus of claim 10, further including:
  (a) second transducer means adapted to convert the magnitude of a second selected parameter into an electrical impedance corresponding thereto;
  (b) said oscillator circuit means further including a second charging circuit including said second transducer means for charging to a predetermined potential in a second time interval whose duration is a function of the electrical impedance of said second transducer means, said second time interval having a duration that is at least greater than the duration of the maximum time interval produced by the first said charging circuit; and
  (c) switching means alternately connecting the first said charging circuit and said second charging circuit to a potential source, and including means responsive to the generation of a signal impulse for alternating said switching means,
whereby the duration of a time interval is sufficient to identify the parameter whose magnitude is being signalled and the magnitude thereof, and successive time intervals represent different parameters.

12. In a producing well having an electrically conductive tubing string and casing and apparatus for representing downhole physical parameters by time intervals marked by signal pulses, apparatus for transmitting signal pulses to the surfaces comprising:
  (a) signal generating means for producing signal pulses at time intervals, the duration of the interval between successive pulses being uniquely determinative of the identity and magnitude of a downhole physical parameter;
  (b) step-down transformer means connected to said signal generating means to receive the signal pulse therefrom and having first and second output terminals for changing the voltage amplitude of pulses to magnitudes compatible with transmission through a low impedance, one of said output terminals being connected to the tubing string and the other of said output terminals being connected to the casing;
  (c) insulating means for substantially isolating electrically the tubing string from the casing below the surface;
  (d) connecting means for electrically interconnecting the tubing string and casing serially at the surface; and
  (e) step-up transformer means including a secondary coil fitted in the annular space between tubing string and casing near the surface so that said secondary coil is inductively coupled to the serially interconnected tubing string and casing for changing the voltage of pulses transmitted from said step-up transformer means to magnitudes compatible with signal receiving and recording circuits.

13. A self-powered signalling instrument adapted to be installed downhole in a producing well for signalling through the casing and tubing of the well the magnitudes of selected downhole physical parameters, the well having intermittent flow characteristics, wherein a force is periodically applied to and removed from the tubing string, the instrument comprising:
   (a) a housing adapted to be installed in a tubing sub and including means for retrieval from the surface;
   (b) linear alternator means mounted within said housing and having a movable first member elastically supported for motion relative to said housing member and a fixed second member rigidly attached to said housing, one of said first and second members including a permanent magnet and the other of said first and second members including an inductive coil for cooperatively engaging said permanent magnet, said alternator means being operable in response to motion applied to said housing for inducing alternating current electricity in said coils;
   (c) rectifier means connected to said alternator means for converting alternating current to direct current;
   (d) power storage means connected to said rectifier means for storing and supplying direct current electricity at a substantially constant potential difference;
   (e) parameter signalling means including a transducer adapted to respond to a selected physical parameter in the downhole environment, and a charging circuit including said transducer, the charging time of which is proportional to and representative of the selected parameter for producing signal pulses when said charging circuit reaches a predetermined voltage; and
   (f) signal transmitting means connected to said parameter signalling means, including step-down transformer means for converting signal voltages to levels compatible with conductive transmission through the casing and tubing.

References Cited

UNITED STATES PATENTS 3,305,825   2/1967   Godbey _____________ 340—18

RODNEY D. BENNETT, *Primary Examiner.*

C. E. WANDS, *Assistant Examiner.*

U.S. Cl. X.R.

181—.5